United States Patent
Shaw et al.

(10) Patent No.: US 6,928,227 B2
(45) Date of Patent: Aug. 9, 2005

(54) AMPLIFICATION WITH CHALCOGENIDE GLASS FIBER

(76) Inventors: L. Brandon Shaw, 4488 Occoquan View G, Woodbridge, VA (US) 22192; Jasbinder S. Sanghera, 10038 Beacon Pond La., Burke, VA (US) 22015; Peter Thielen, 7527 Buchanna St. #349, Landover Hills, MD (US) 20704; Ishwar D. Aggarwal, 9908 Thorn Bush Dr., Fairfax Station, VA (US) 22039

( * ) Notice: Subject to any disclaimer, the term of this patent is extended or adjusted under 35 U.S.C. 154(b) by 445 days.

(21) Appl. No.: 09/906,010

(22) Filed: Jul. 12, 2001

(65) Prior Publication Data

US 2003/0012491 A1 Jan. 16, 2003

(51) Int. Cl.[7] ................................................ G02B 6/00
(52) U.S. Cl. ........................ 385/141; 385/142; 359/334
(58) Field of Search ................................. 385/141, 142, 385/122, 12, 13; 359/334, 346

(56) References Cited

U.S. PATENT DOCUMENTS 5,323,404 A * 6/1994 Grubb ............................ 372/6
5,973,824 A   10/1999 Sanghera et al.
6,504,645 B1 * 1/2003 Lenz et al. .................. 359/334

OTHER PUBLICATIONS

Asobe et al., "Third–order nonlinear spectroscopy in As2S3 chalcogenide glass fibers", Journal of Applied Physics 77 (11), Jun. 1, 1995, 5518–5523.*

* cited by examiner

*Primary Examiner*—Robert H. Kim
*Assistant Examiner*—Michael H Caley
(74) *Attorney, Agent, or Firm*—John J. Karasek; George A. Kap

(57) ABSTRACT

This invention pertains to an optical device and method for using a chalcogenide glass waveguide to amplify a pump light beam by means of stimulated Raman scattering and obtaining a depleted pump light beam and an amplified beam at a wavelength higher than the wavelength of the depleted pump light beam.

18 Claims, 3 Drawing Sheets

AMPLIFICATION WITH CHALCOGENIDE GLASS FIBER

FIELD OF THE INVENTION

This invention pertains to the use of a low phonon energy chalcogenide glass waveguide in conjunction with stimulated Raman scattering to amplify an optical signal in a glass waveguide.

DESCRIPTION OF RELATED ART

Fiber optic devices, such as amplifiers and lasers, based upon silica-based glasses, have many military and commercial applications. To date, however, wavelengths have been limited to the optical transmission window of silica glass fiber, i.e., from the visible to about 2 μm. Rare earth doped solid-state lasers are available for the 2–12 μm region; however, these lasers are bulky and technically complex. Some experimental diode laser sources are available, however, they require cryogenic cooling and are unreliable. Fiber lasers and amplifiers operating in the infrared region beyond 2 μm would offer many advantages over the current laser systems including compact size, stability, long life and ease of fabrication. Of particular interest is developing lasers that can generate high power light in the wavelength regions of 2–5, 5.9–6.5, and 8–12 μm. The 2–5 μm region is a region of high atmospheric transmission and also a fingerprint region for chemical sensing. Lasers and amplifiers in the region are of great use for remote sensing and infrared countermeasures. The wavelength region of 5.9–6.5 μm corresponds to a protein absorption region and, consequently, lasers and amplifiers operating in this region are useful for surgery and biomedical applications. Currently, only free-electron lasers are able to deliver enough energy at this wavelength to be viable for surgery. The 8–12 μm region is another atmospheric transmission region as well as a fingerprint region for chemical and biological sensing. Again, lasers operating in this region are useful for remote sensing and countermeasures.

Lasers and amplifiers based upon silica fiber have been demonstrated and widely utilized as sources and amplifiers in telecommunications applications. These devices have enabled the fast or high bit rate telecommunications systems in operation today. For the next generation systems, however, sources and amplifiers that are more efficient and offer new capabilities are needed. For example, silica fiber Raman amplifiers while allowing amplification over the entire telecom band, require several hundred meters of silica fiber and high pump power to produce sufficient gain. A fiber material with higher Raman gain coefficient would allow compact, high efficiency devices with low thresholds for operation. Note also, that the relatively short fiber lengths required for chalcogenide based Raman amplifiers may reduce some of the detrimental nonlinear and other signal degrading effects seen in silica based amplifiers.

The narrow linewidth of chalcogenide Raman scattering cross-section as compared to that of silica makes chalcogenide glass fibers suitable for narrow band Raman amplifiers. This can be seen by considering two closely spaced signals to be amplified. Fiber amplifiers fabricated from materials with a broad Raman scattering cross-section will amplify both signals. In order to amplify just one signal, the fiber amplifier mut be fabricated from a material whose effective Raman scattering cross-section is narrow enough that only one of the signals is amplified.

To date, however, no fiber material has been shown to have high enough Raman gain, low enough loss, an/or narrow enough linewidth to enable Raman fiber lasers and amplifiers in these regions for these applications.

Sanghera et al U.S. Pat. No. 5,937,824 is directed to amplification of an optical signal by means of dysprosium-doped low phonon energy glass waveguides. The Asobe et al article entitled "Third-Order Nonlinear Spectroscopy In $As_2S_3$ Chalcogenide Glass Fibers" published in J. Appl. Phys. 77(11), Jun. 1, 1995, performed a numerical analysis to determine whether Stimulated Raman Scattering (SRS) has a detrimental effect on the temporal response of all optical ultrafast nonlinear switching based on the third order non-linearity ($X^3$) in $As_2S_3$ glass fiber. Asobe et al do not claim or demonstrate, nor is it obvious from their paper, the use of Raman scattering for amplifiers or lasers claimed herein.

OBJECTS AND BRIEF SUMMARY OF THE INVENTION

An object of this invention is an optical device which transmits in the wavelength region of up to about 15 μm that has high enough Raman gain, low enough loss, and/or narrow enough linewidth to enable Raman fiber lasers, amplifiers and a method for amplifying a light beam by the use of a chalcogenide glass gain medium/fiber.

Another object of this invention is a method and an optical device utilizing chalcogenide glass fiber to amplify a light beam by means of stimulated Raman scattering.

Another object of this invention is the use of a chalcogenide glass fiber in a Raman amplifier or a Raman laser wherein an optical signal is amplified due to stimulated Raman scattering in the fiber.

Another object of this invention is the method for achieving high efficiency Raman fiber lasers and amplifiers using stimulated Raman scattering in infrared transmissive chalcogenide glass fibers to frequency shift a shorter wavelength pump beam to a longer wavelength Stokes beam.

Another object of this invention is an optical device that is smaller and more compact.

DETAILED DESCRIPTION OF THE INVENTION

This invention describes a new approach for achieving high efficiency Raman glass fiber lasers and amplifiers in the infrared region. The approach involves utilizing Stimulated Raman Scattering (SRS) in infrared transmissive chalcogenide glass fibers to frequency shift a shorter wavelength pump beam to a longer wavelength Stokes beam. The use of chalcogenide glass fibers for Raman lasers and amplifiers not only allows high efficiency Raman conversion due to the high Raman cross-section of the material, but enables high average power sources in wavelength regions unreachable by current fiber laser sources based upon silica fibers due to the longer wavelength transparency of a chalcogenide glass. Amplification of intensity of an optical signal of at least 100 times can be achieved using the invention disclosed herein. By choosing a suitable pump wavelength, Raman lasers and amplifiers can be utilized to generate or amplify light in the wavelength region of about 1–15 $\mu$m, limited only by the transmission of the chalcogenide glass. Furthermore, the high gain and narrow linewidth of the Raman line in a chalcogenide gain medium allow narrow band Raman amplification throughout the infrared region. The amplification method includes the steps of introducing the optical signal to be amplified into the coupler, introducing a pump optical signal into the coupling means, combining the optical signal and the pump optical signal, introducing the combined optical signal into the amplifier and amplifying the optical signal by stimulated Raman scattering.

It is noted that the term "glass fiber" is used herein. It should be understood that a person skilled in the art can use a glass waveguide to achieve same or similar purposes. As used herein the term, "waveguide", is used to define any device that is designed to confine and direct the propagation of electromagnetic waves. Examples of waveguides include optical fibers, planar waveguides, channel or ridge waveguides, and microstructured fiber.

Chalcogenide glasses comprise at least one of the chalcogenide elements sulfur (S), selenium (Se), and tellurium (Te) and typically further include at least one of Ge, As, Sb, Tl, Pb, Ba, Si, P, Ga, In, Cl, Br, an I. Chalcogenide glass typically contains at least 25 mole %, and more typically at least 50 mole % of one or more of the three chalcogenide elements but less than about 90 mole %, and typically less than 80 mole %. As used herein, the term "chalcogenide glass" includes chalcohalide glass.

Figure 1:
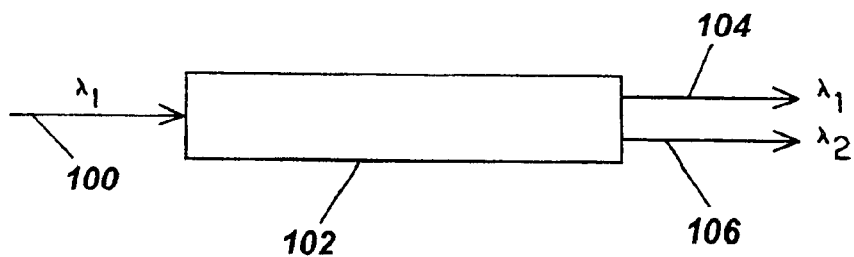
FIG. 1 is a sketch illustrating the conceptual use of stimulated Raman scattering (SRS) in a chalcogenide glass fiber to frequency shift a shorter wavelength pump beam to a longer wavelength Stokes beam.

FIG. 1 generally illustrates the concept of stimulated Raman scattering in a glass fiber. Referring to FIG. 1, a light beam 100 at wavelength $\lambda_1$ is launched at one end into a glass fiber 102 that produces spontaneous Raman scattering in the fiber. Fiber 102 can be a chalcogenide fiber or another fiber. The light beam 100 goes through the fiber and issues forth from the other end of the fiber 102 as light beam 104 at wavelength $\lambda_1$ but at a lower intensity than light beam 100. The depleted light beam 104 of wavelength $\lambda_1$ is depleted due to pump light beam 100 interactions with the host glass fiber 102. The energy that the light beam 100 losses in its interaction with fiber 102 produces the Raman scattered light that exits the fiber as light beam 106, i.e., the Raman signal, which is of higher wavelength, $\lambda_2$, than light beam 104 but is typically at a lower intensity.

Figure 2:
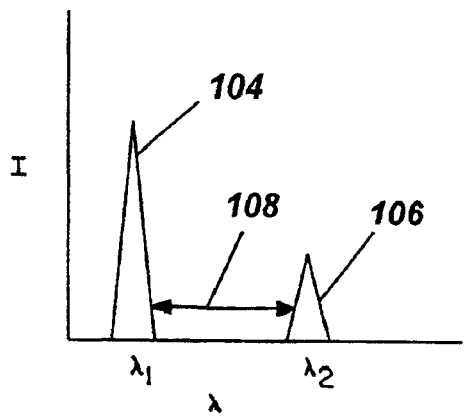
FIG. 2 is a plot in intensity (I) versus wavelength (λ) and demonstrates the relative disposition of the pump wavelength, $\lambda_1$, and the first Stokes wavelength, $\lambda_2$, generated by the Raman process.

FIG. 2 illustrates the wavelengths $\lambda_1,\lambda_2$ of the light beams 104, 106 with Raman shift 108 corresponding to the spacing between the wavelengths $\lambda_1,\lambda_2$ of light beams 104, 106. The Raman shift 108 is dependent, inter alia, on the phonon energy of the host glass fiber. For example, Raman shift is approximately 440 cm$^{-1}$ for a silica fiber and 230 cm$^{-1}$ for a corresponding chalcogenide fiber.

The parameter that is determinant of the glass fiber length in an optical device is the Raman gain coefficient. For silica, the Raman gain coefficient is about 1×10$^{-13}$ m/W and for a chalcogenide (As—Se), it is about 2.7×10$^{-11}$ m/W, which is about 300 times larger than that for silica. For purposes herein, this means that when using a chalcogenide glass fiber, the fiber need be about 1/300 as long when compared to a silica fiber to accomplish about the same amplification function for the same pump power. For example, silica glass fiber Raman amplifiers require several hundred meters of silica glass fiber and high pump power to produce useful gain. Chalcogenide glass fiber has a much higher Raman gain coefficient and therefore, allows for compact, high efficient optical devices with low thresholds for operation requiring more than one-hundred times less fiber.

Figure 3:
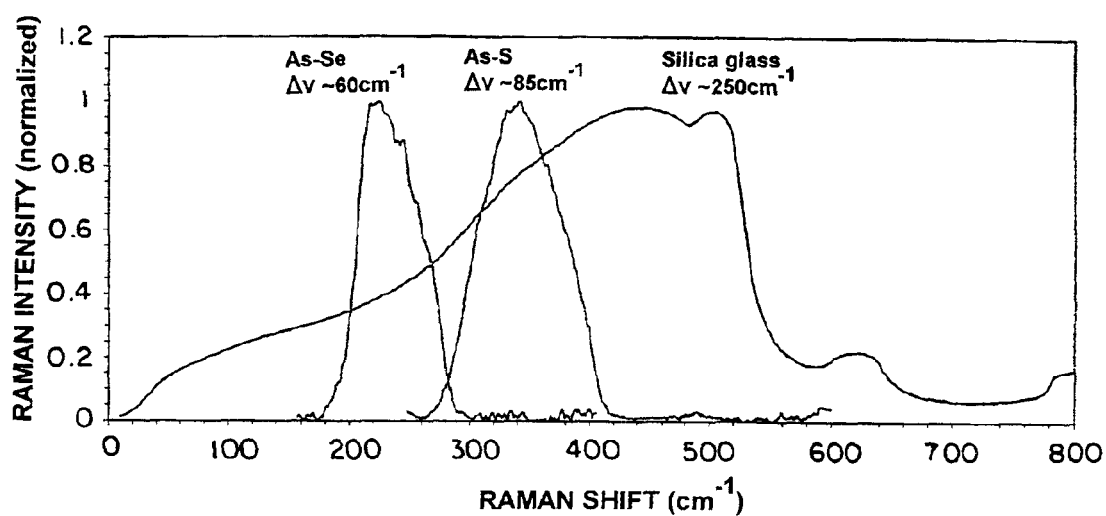
FIG. 3 is a plot of normalized Raman Intensity versus Raman Shift for silica and two chalcogenide glasses As—Se and As—S showing a very large bandwidth for silica glass and much narrower bandwidths for the chalcogenide glasses As—Se and As—S.

The narrower linewidth of the Raman scattering cross-section of chalcogenide glass can be seen by comparing the Raman spectra of silica glass to that of As—Se and As—S chalcogenide glasses. As shown in FIG. 3, the linewidth ($\Delta v$) or the full-width-half-max (FWHM), i.e., bandwith, for the As—Se chalcogenide glass is about 60 cm$^{-1}$ and for the chalcogenide glass As—S it is about 85 cm$^{-1}$. For silica glass, the linewidth is about 250 cm$^{-1}$.

A Raman fiber amplifier in its simplest form consists of a pump source, a signal source, and a fiber that acts as a gain medium. For optimum results, the amplifier should be constructed with single mode fiber. Fiber couplers, WDM splitters, or dichroic beam splitters may also be utilized to combine pump beam and the signal beam for launching into and/or coupling out of the fiber. During operation, the pump beam in the fiber interacts with the vibrational modes of the fiber medium to transfer part of its energy to the signal beam by the Raman process. As a result, the signal is amplified as it passes along the length of the fiber.

Figure 4:
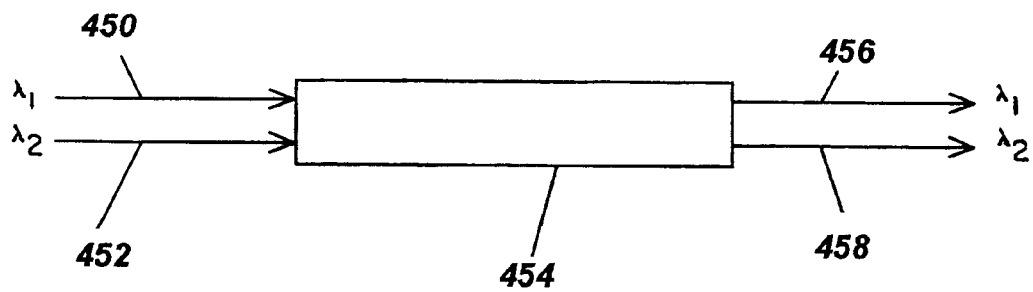
FIG. 4 is a sketch of a portion of an amplifier wherein a pump beam and a signal beam are passed into a chalcogenide glass fiber at one end thereof and a depleted pump light beam and an amplified signal beam are received at the other end of the fiber.

A portion of an amplifier is illustrated in FIG. 4 where pump light beam 450 of wavelength $\lambda_1$ and signal light beam 452 of wavelength $\lambda_2$ of a lower intensity than the pump light beam 450 are launched into one end of glass fiber 454. Light beam 452 interacts with light beam 450 and the fiber 454 through stimulated Raman scattering and is amplified. At the opposite end of the fiber 454, depleted beam 456 at wavelength $\lambda_1$ and amplified light beam 458 at wavelength $\lambda_2$ issue forth. On energy or power basis, the following equation (1), below, holds true for amplification by stimulated Raman scattering:

$$E_{pump\ (450)} = E_{ph} + E_{signal\ (458)} \qquad (1)$$

where $E_{pump\ (450)}$ is energy of pump light beam 450 which is typically generated by laser, $E_{ph}$ is the Raman shift of the fiber, and $E_{signal\ (458)}$ is the energy of the amplified light beam 458. For the general comparison of an amplifier based on a single mode silica glass fiber 454 having a Raman shift of 440 cm$^{-1}$ and being 1 kilometer long with pump light beam 450 at 300 mW power and 1.45 $\mu$m wavelength $\lambda_1$ and signal light beam 452 at 0.1 mW power and 1.55 $\mu$m wavelength $\lambda_2$, issuing light beam 456 is depleted in power and its wavelength $\lambda_1$ is 1.45 μm and the amplified light beam 458 is at 2 mW power and its wavelength $\lambda_2$ is 1.55 μm. So, with a silica fiber 1 kilometer long, amplification is about 20 times corresponding to a gain of 13 dB, i.e., from 0.1 mW to 2 mW.

With a single mode chalcogenide fiber As—Se, the situation is different. Assuming the chalcogenide fiber 454 to be 4 meters long, with negligible loss, and having a Raman shift of 230 cm$^{-1}$, the pump light beam 450 at the same 300 mW power but at wavelength $\lambda_1$ of 1.50 μm and signal light beam 452 being at the same power of 0.1 mW and at the same wavelength $\lambda_2$ of 1.55 μm issuing light beam 456 is depleted in terms of power at the same wavelength $\lambda_1$ of 1.50 μm and the amplified light beam 458 at the same power of 2 mW and at the same wavelength $\lambda_2$ of 1.55 μm. The gain here is also 13 dB. The physical parameters of the silica and the chalcogenide glass fibers were the same except for the length.

The comparison of the Raman amplifiers based on silica and chalcogenide glass fibers is astounding and totally unexpected. Length of the fiber can be reduced about 250 times and still obtain comparable amplification.

Assuming that equation (1), above, is obeyed, more than one optical signal can be amplified simultaneously. The signals can be at different wavelengths provided that they are within the bandwidth of the particular glass fiber used. FIG. 3 identifies a bandwidth of 250 cm$^{-1}$ for silica glass fiber, a bandwidth of 60 cm$^{-1}$ for chalcogenide As—Se glass fiber, and a bandwidth of 85 cm$^{-1}$ for chalcogenide As—S glass fiber. Stimulated Raman scattering can amplify the signals falling within these particular bandwidths.

Figure 5:
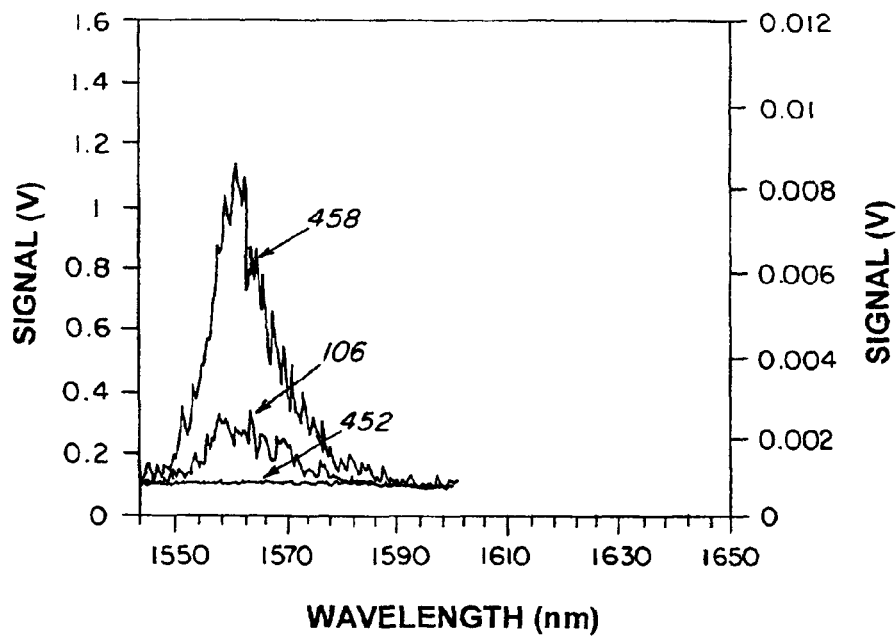
FIG. 5 is a plot of experimental results showing the Signal (V) versus Wavelength (nm) and demonstrates the use of stimulated Raman scattering to amplify a weak signal light beam in As—Se.

FIG. 5 illustrates the large amplification of the signal 452 of $\lambda_2$ wavelength.

Figure 6:
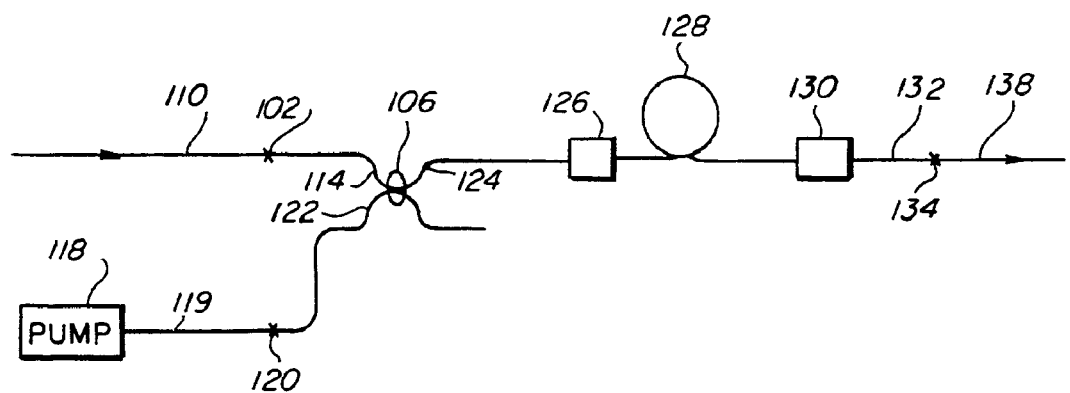
FIG. 6 is a more complete sketch of a Raman amplifier using a chalcogenide glass fiber to amplify an optical signal by means of stimulated Raman scattering.

FIG. 6 is a schematic representation of a Raman amplifier. The amplifier includes a coupler 106, a pump light source 118 in communication with the coupler 106, a chalcogenide fiber 128 in communication with the coupler at the left end thereof. The first signal light optical fiber 100 is routed to and fusion spliced at 102 with port 114 of a coupler, designated as 106. Signal fiber 119 carries the signal to be amplified and is a silica fiber. Pump source 118, such as a laser, is coupled into the fiber 119 which is fusion spliced at 120 with port 122 of coupler 106. On the other side of the coupler, i.e., after the signal light and the pump light are combined, port 124 is butt joined at 126 to one end of amplifier fiber 128 that is a chalcogenide fiber.

A fiber Raman laser in its simplest form consists of a gain medium in a Fabry-Perot cavity for wavelength selective feedback. The Fabry-Perot cavity can be formed by reflecting means such as mirrors or fiber Bragg gratings written into the fiber. The front mirror of the cavity is highly transmissive to the pump and highly reflective at the Stokes wavelength. The output mirror of the cavity is partially transmissive at the Stokes wavelength and can be highly reflective at the pump wavelength. In a fiber Raman laser, the pump laser initially excites spontaneous Raman scatter. The mirrors or gratings forming the cavity selectively feedback the Stokes wavelength into the fiber that is then amplified by the stimulated Raman scattering process as it oscillates in the fiber cavity. A small portion of this amplified emission, as determined by the reflectivity output mirror or grating, is coupled out as the laser output. For the laser to reach threshold, the Raman amplification during a round trip gain must equal the cavity losses that consist mainly of the losses at the reflecting means forming the cavity.

Other configurations of Raman fiber lasers include ring lasers and cascaded Raman fiber lasers. In the former, the pump and Stokes oscillate in a fiber ring cavity and the Stokes beam is coupled out with a wavelength division multiplexer (WDM) coupler. The latter embodiment involves cascading several Fabry-Perot cavities such that the output Stokes from one cavity is trapped in the next Fabry-Perot cavity that generates and amplifies a second Stokes at longer wavelength. With this process, the initial pump beam may be shifted up in wavelength through several Stokes shifts to generate a high power beam at wavelengths corresponding to multiples of the Raman shift.

Figure 7:
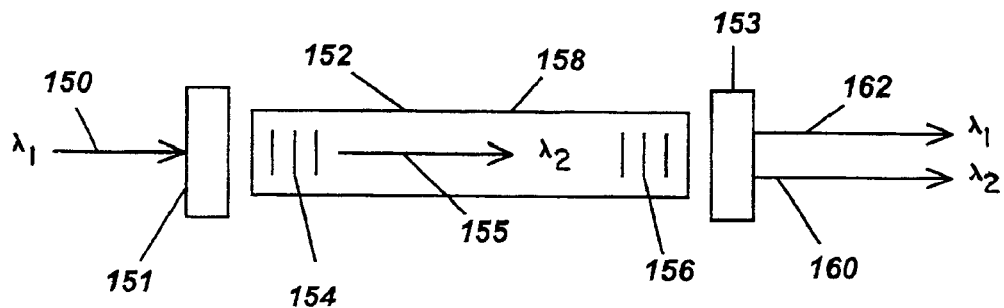
FIG. 7 is a sketch of a laser wherein a pump light beam is passed into one end of a chalcogenide glass fiber arranged in a cavity structure provided with reflecting means, such as mirrors or gratings, and a depleted pump light beam and a laser light beam at a Raman shifted wavelength issue from the opposite end of the fiber.

FIG. 7 is an illustration of a basic laser structure with pump light beam 150 at wavelength $\lambda_1$ entering glass fiber 152. Glass fiber 152, having at both ends thereof mirrors or other reflectors 151, 153, is provided with a pair of spaced fiber Bragg gratings 154, 156 at ends of the fiber creating cavity 158 between the spaced gratings. Passing through the glass fiber in the cavity between gratings 154, 156, light beam 150 creates a light beam 155 at wavelength $\lambda_2$ by means of spontaneous Raman scattering. Gratings 154, 156 reflect light 155 at wavelength $\lambda_2$ back and forth in cavity 158 and every time the light at wavelength $\lambda_2$ is reflected, it interacts with pump light beam 150 and extracts energy through stimulated Raman scattering and is thus amplified. Reflection by gratings 154, 156 of light 155 in the fiber at wavelength $\lambda_2$ is continued in order to amplify the light at wavelength $\lambda_2$. Since grating 156 is designed so that its reflectivity is not 100%, some of light 155 at wavelength $\lambda_2$ in cavity 158 escapes through grating 156 and issues out of fiber 152 as laser light beam 160 at wavelength $\lambda_2$. Light beam 150 at wavelength $\lambda_1$ travels through fiber 152 once, gives up most of its energy to light 155 at wavelength $\lambda_2$ and exits the glass fiber as a depleted light beam 162 at wavelength $\lambda_1$.

As noted earlier, of particular interest in development of lasers in the generation of high power light in certain regions, such as the wavelength region of 5.9–6.5 μm which corresponds to protein absorption. Lasers operating in this region are useful for surgery and biomedical applications. Conducting laser surgery at 5.9–6.5 μm results in a minimally scarring and a minimally damaging procedure. At present, only free-electron lasers are able to deliver enough energy at this wavelength to be viable for surgery.

Having described the invention, the following examples are given as particular embodiments thereof and to demonstrate the practice and advantages thereof. It is understood that the examples are given by way of illustration and are not intended to limit the specification or the claims in any manner.

EXAMPLE 1

Figure 8:
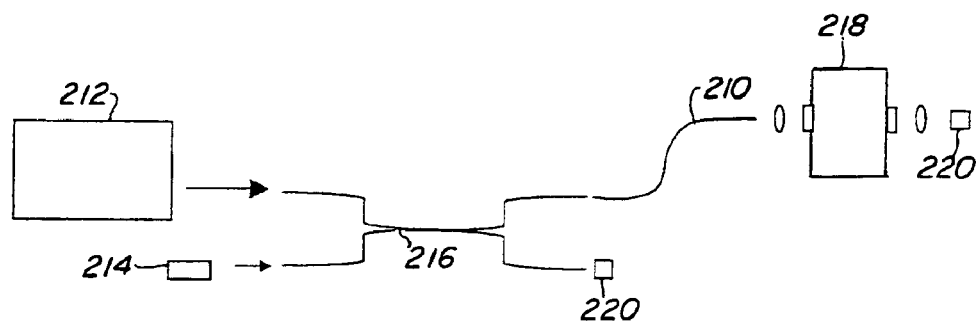
FIG. 8 is the experimental setup for Experiment 1.

To demonstrate the Raman fiber amplifier and laser invention herein, Raman amplifier was fabricated operating at 1.56 μm in order to measure the Raman gain coefficient. FIG. 8 shows the experimental setup for the experiment.

The device included a 1 meter section of As—Se fiber 210 with about 7 μm core and 100 μm cladding having NA of 0.45. The fiber loss was about 0.7 dB/m at 1.5 μm. The fiber was not single mode at 1.5 μm but was multimode since it could support up to nine modes. The device was pumped with Continuum Mirage OPO 212 at 1.56 μm with about 8 W of peak power in a 5 ns pulse. The signal source 214 was a 1.56 μm diode laser that was mixed with the pump laser using a 2×2 coupler 216. The amplified 1.56 μm signal was spectrally separated from the pump by a Jarrel-Ash ¼ meter monochromator 218 and detected with an InGaAs detector 220. The results are generally shown in FIG. 5. The unamplified diode laser signal without the pump was approximately 40 μV, which was amplified to about 14 mV with the pump on. The background SRS was about 3 mV, as measured with the pump on and no signal source. The gain was calculated as 24 dB. From the fiber core diameter, measured gain, and loss in the fiber, a Raman gain of coefficient $g_R$ of $2.7 \times 10^{-11}$ m/W was calculated, which is about 250 times that for a silica fiber. This value can be improved considerably by using a single mode fiber.

EXAMPLE 2

The demonstration of a fiber Raman amplifier of Ex. 1 shows the viability of the device. It has also been demonstrated that the device can operate farther into the IR by recording Raman signal at 1.91 µm under 1.83 µm pump and at 6.2 µm under 5.4 µm pump.

While presently preferred embodiments have been shown of the invention disclosed herein, and of the several modifications discussed, persons skilled in this art will readily appreciate that various additional changes and modifications can be made without departing from the spirit of the invention as defined and differentiated by the following claims.

What is claimed is:

1. An optical device comprising a coupler for coupling pump and signal light beams, a chalcogenide gain medium connected to said coupler for allowing said light beams to interact and to have at least one of said signal light beam amplified in intensity by means of stimulated Raman scattering, wherein said gain medium is a selenide glass waveguide selected from the group consisting of optical fibers, planar waveguides, containing at least 25 mole % of selenium.

2. The device of claim 1 wherein said gain medium contains at least 50 mole % but less than about 90 mole % of selenium.

3. The device of claim 2 wherein said device is an amplifier, wherein the device can amplify intensity of said signal light beam.

4. The device of claim 3 wherein said glass waveguide is fabricated from As—Se glass.

5. An optical device comprising a chalcogenide gain medium, at least two spaced reflectors associated with said gain medium forming a cavity there between for reflecting at least one light beam whereby interaction of said at least one light beam creates at least one amplified light beam, at least one of said reflectors having reflectivity lower than 100% so that at least one of said amplified light beams can exit said cavity, wherein said gain medium is a selenide glass waveguide containing at least 25 mole % of selenium.

6. The device of claim 5 wherein said glass waveguide is fabricated from As—Se glass.

7. The device of claim 5 wherein said gain medium is a glass waveguide containing at least 50 mole % but less than about 90 mole % of selenium.

8. The device of claim 7 wherein said device is a laser whose output is at a wavelength of 1–15 µm.

9. The device of claim 8 wherein said reflectors are gratings written into said glass waveguide wherein reflectivity thereof is less at the exit end and wherein said device is fabricated from As—Se glass.

10. The device of claim 8 wherein said reflectors are mirrors wherein reflectivity thereof is less at the exit end.

11. The device of claim 10 wherein said glass waveguide is fabricated from As—Se glass.

12. A method for amplifying a light beam comprising the steps of passing into a selenide glass gain medium at one end thereof a pump light beam and a signal light beam of a higher wavelength than the wavelength of the pump light beam wherein the pump light beam interacts with the gain medium and imparts intensity to the signal light beam to thus amplify the signal light beam by means of stimulated Raman scattering caused by the interaction of the pump light beam and the gain medium, and issuing at the other end of the gain medium as intensity depleted pump light beam and an amplified in intensity signal beam at the same wavelength as the signal light beam entering the gain medium.

13. The method of claim 12 wherein the gain medium contains at least 25 mole % of selenium.

14. The method of claim 13 wherein the glass waveguide is a glass fiber with a core of about 1–25 µm in diameter.

15. The method of claim 13 wherein the gain medium contains at least 50 mole % but less than 90 mole % of selenium.

16. The method of claim 13 wherein the glass waveguide is fabricated from $As_xSe_y$, wherein x varies from 10 to 75 mole percent and y varies from 90 to 25 mole % and wherein the sum of x and y is 100 mole %.

17. A method for amplifying a light beam over the wavelength region of about 1–15 µm comprising the steps of passing into one end of a selenide glass waveguide, a pump beam of wavelength $\lambda_1$ which generates a Stoke's signal beam at wavelength $\lambda_2$, reflecting the signal beam in the waveguide between spaced reflectors numerous times, and issuing from the other end of the waveguide a depleted pump light at wavelength $\lambda_1$ and an amplified signal beam at wavelength $\lambda_2$, wherein $\lambda_2$ is greater than $\lambda_1$; wherein the waveguide contains at least 50 mole % and less than 90 mole % of selenium.

18. The method of claim 17 wherein the glass waveguide is fabricated from $As_xSe_y$, wherein x is 10–75 mole % and y is 90–25 mole % wherein the sum of x and y is 100 mole %.

* * * * *